Jan. 4, 1966 D. G. HAINES 3,227,459

TONE ARM MOUNTING FOR RECORD PLAYERS

Filed Feb. 13, 1963 2 Sheets-Sheet 1

INVENTOR.
Donald G. Haines
BY
Snow and Benno
Attys

Jan. 4, 1966 D. G. HAINES 3,227,459

TONE ARM MOUNTING FOR RECORD PLAYERS

Filed Feb. 13, 1963 2 Sheets-Sheet 2

INVENTOR.
Donald G. Haines
BY
Snow and Benno
Attys.

United States Patent Office 3,227,459
Patented Jan. 4, 1966

3,227,459

TONE ARM MOUNTING FOR RECORD PLAYERS

Donald G. Haines, 226 Grace, Elmhurst, Ill.
Filed Feb. 13, 1963, Ser. No. 258,353
6 Claims. (Cl. 274—23)

This invention relates to a new and improved tone arm mounting for record players.

In the past tone arms have been counterbalanced to effect a proper stylus pressure on the record being played. A common method to control stylus pressure is to employ a counterweight at the rear of the tone arm to provide a partial balance and in combination therewith include a spring which can be readily adjusted to establish the desired vertical stylus pressure. Recently engineers have been designing high fidelity records which require less and less stylus pressure. Whereas original record players had substantial weight on the stylus for engagement with a record groove, the modern record player is being designed for a minimum of tone arm pressure on the record. Presently the weight of the stylus is in the order of two to three grams of pressure and it is contemplated that this weight shall be still further reduced, possibly in the order of only a fraction of a gram. When the engagement of the stylus with the record is by such a small pressure, it takes only a minimum of shock to cause the stylus to become disengaged from the record groove. If, for example, the turntable were to be tilted in only a minor degree the weight used to counterbalance the vertical pressure of the stylus then acts as an accelerator for arcuate shifting of the tone arm which will likely cause a scratching of the stylus across the entire surface of record grooves. The present invention is related to the establishment of vertical stylus pressure. The invention provides a freedom of choice of the ratio of tone arm mass to the stylus pressure which permits obtaining optimum conditions for stability to vertical shock.

In addition, this freedom of choice of tone arm design is valuable to establish other conditions of importance to good performance: such as the frequency of the vertical tone arm resonance which must be chosen for good engineering. This resonant frequency is mostly a function of (a) tone arm mass, (b) vertical stylus pressure, and (c) the compliance of the stylus. Any counterweights employed by applicant have no effect whatever on the vertical stylus pressure. Also the present invention is concerned with the mounting of a tone arm in such a manner and position that the tone arm assembly will be in a state of equilibrium about a vertical shaft.

A principal object of the present invention is to reduce the effect of lateral shock on a record player so that the tone arm will maintain its position in the record groove during operation regardless of the degree of stylus pressure on the record.

Another important object of this invention is to enhance record playing stability by making the tone arm as light as possible and preferably substantially equal to the desired pressure of the stylus on the record.

Still another important object of this invention is to supply a counterweight on the stationary portion of a tone arm hinge to thereupon balance the tne arm in a lateral direction about a substantially vertical pivot.

Another important object of this invention is to employ a tone arm with neutral equilibrium about a main pivot on which the tone arm swings laterally across the record to be played.

Still another important object of this invention is to provide a tone arm for a record player having a vertical shaft serving as the main pivot for the tone arm and in which the tone arm has no lateral forces to offer frictional resistance to the playing of the record.

A still further important object of this invention is the provision that the center of gravity of a tone arm assembly complete with cartridge spring and hinge assembly is at the center of the main pivot of the assembly.

A further important object of this invention is to provide a mount for a tone arm assembly which is so balanced laterally that lateral shock at the main pivot will not change the direction in which the tone arm is positioned.

Another and still further important object of this invention is to provide a linkage between two laterally spaced apart pivots of a tone arm mounting so that enough mass is arranged to overhang the main pivot toward the rear of the tone arm in such a manner that balance about the main pivot is accomplished.

Another important object of this invention is to supply an enclosure around the rear portion of a tone arm and its mounting mechanism and the enclosure arranged to carry suitable weights to establish balance or neutral equilibrium about the main pivot.

Other and further objects and advantages will become apparent from the disclosures in the following specification and accompanying drawings.

Figure 1:
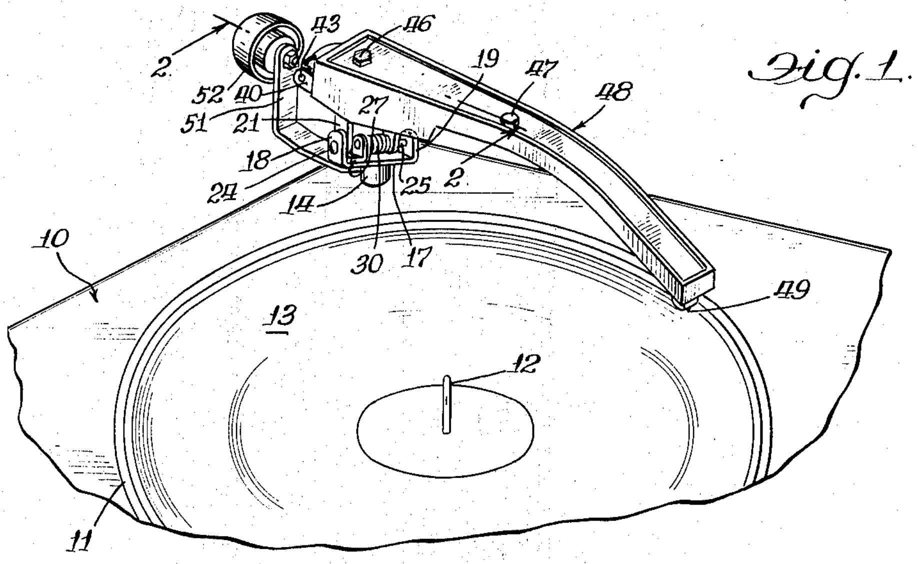
FIGURE 1 is a perspective view of a portion of a record player including a turntable, a tone arm and its mounting.

The reference numeral 10 indicates a generally horizontally disposed table support having a record carrying turntable 11 mounted thereon. The turntable 11 is driven by suitable motor means not shown. A central spindle or pilot pin 12 is disposed centrally of the turntable and is adapted to pass through the center hole of a disc shaped record 13. The table support 10 and the turntable 11 may be a manual record player or may be a part of an automatic changer type of record player.

Figures 2, 8:
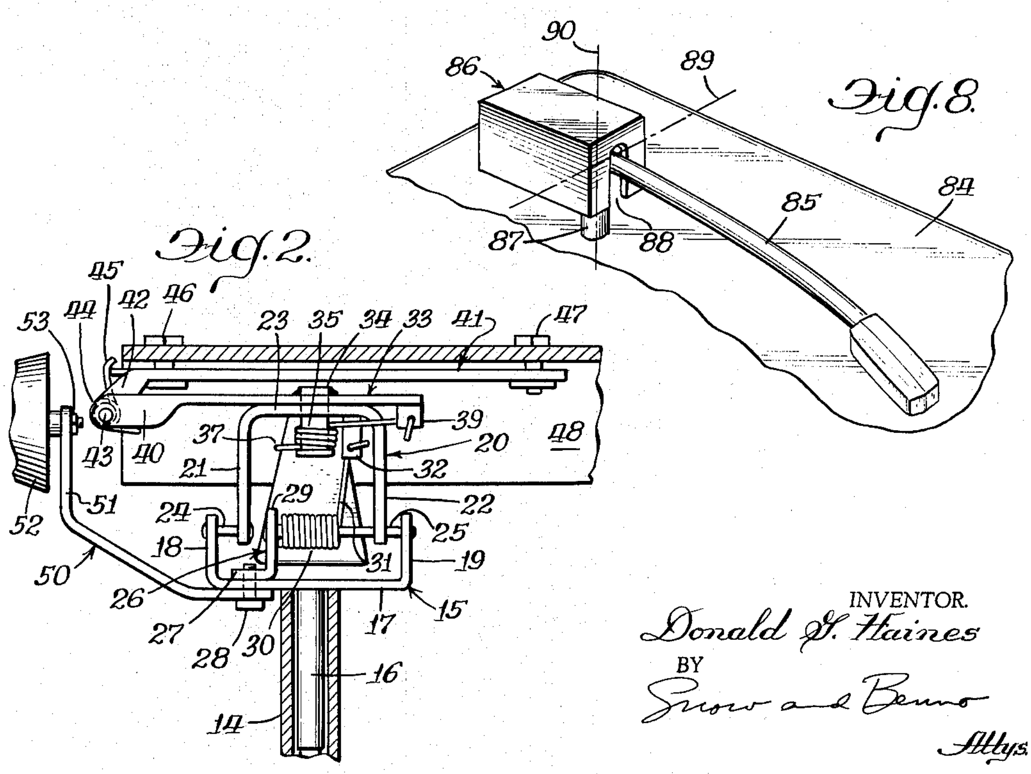
FIGURE 2 is an enlarged sectional view taken on the line 2—2 of FIGURE 1 and shows the particular hinge mounting of the tone arm of FIGURE 1.
FIGURE 8 is a perspective view of a still further modified form of tone arm mount of this invention.

A generally vertically disposed post 14 is mounted on the support 10 adjacent the turntable 11 and is adapted to carry a tone arm for effecting the playing of the record 13 as it is rotated by the turntable 11. A first hinge part 15 has a downwardly projecting pin 16 which is journally mounted in the sleeve post 14 as best shown in FIGURE 2. The hinge part 15 includes a member 17 located across the top of the downwardly projecting pin 16 which has upwardly bent ears 18 and 19 at opposite ends thereof. A second hinge part 20 is provided with spaced apart side members 21 and 22 and an adjoining cross top member 23. Axially aligned stub shafts 24 and 25 are generally horizontally disposed in joining the ears 18 and 21 and 19 and 22 respectively.

An angle member 26 having a base 27 fastened by a bolt 28 to the cross member 17 is provided with an upstanding ear 29 in general alignment with and spaced between the upstanding ears 18 and 19. The stub shaft 25 extends through to the ear 29 of the angle member 26. A coil spring 30 is mounted on the shaft 25 between the ears 29 and 22. One end 31 of the spring 30 extends upwardly for engagement with a downwardly projecting tab 32 from the cross top member 23 of the second hinge part 20. The other end of the spring 30 is anchored to the angle bracket 26 to prevent rotation of the coil spring 30 about the stub shaft 25. The spring 30 thus tends to urge the second hinge part 20 upwardly about the aligned hinge pins 24 and 25 as an axis of hinging movement.

A plate 33 is positioned over the cross top member 23 of the second hinge part. A pin 34 is fastened to the plate 33 and projects downwardly therefrom for passage through a hole in the cross top member 23. A coil spring 35 is wrapped around the projection of the pin 34 below the cross top member 23 of the second hinge part. A back wall 36 of the second hinge part 20 depends downwardly from the cross top member 23. One end 37 of the spring 35 is anchored around the back wall 36. The other end 38 of the spring 35 is mounted in and through a downwardly extending tab 39 from the top plate 33. This construction causes a spring biasing of the plate 33 about the pin 34 as a pivot and urges this plate 33 toward alignment with the top cross member 23 of the second hinge part 20.

An outer end 40 of the plate 33 is formed as a hinge part. An elongated plate 41 lies over the plate 33. The outer end 42 of the elongated plate 41 forms a cooperative hinge part for engagement with the outer end hinge part 40 of the plate 33. A generally horizontally disposed hinge pin 43 joins the hinge parts 40 and 42. A spring 44 is coiled about the hinge pin 43 and has one end anchored to the hinge part 40 and another end 45 engaging the top side of the elongated plate 41 causing the elongated plate 41 to be urged downwardly. Bolts 46 and 47 act to fasten the plate 41 to a tone arm 48. The tone arm comprises a lightweight material channel or inverted U-shape in cross section for lightness of construction. A stylus or record engaging needle 49 is provided in the outer end of the tone arm 48. The tone arm 48 is spring biased downwardly toward the plate 33 by reason of the coil spring 44.

A bracket 50 is fastened at one end to the first hinge part 15 by bolt 28. The bracket includes an upwardly extending end 51 which carries a counterbalancing weight 52. The weight 52 is fastened to the bracket end 51 by a nut 53.

Thus in operation the tone arm 48 and its stylus 49 engages the grooves in the record 13 only by the amount of weight in the tone arm itself. There is no counterweight employed in the tone arm construction to minimize the amount of force of the engagement of the stylus 49 with the grooves of the record 13. The weight 52 does not balance the tone arm 48 for controlling the amount of force by which the stylus engages the record, but rather the weight 52 mounted on the stationary first hinge part 15 causes the entire tone arm and assembly of parts to be balanced or in equilibrium about the post 14.

Record players have been undergoing substantial changes in recent years with the ultimate goal of reproducing high fidelity sound. When the phonograph was originally invented it was necessary only to cause engagement of the spiral groove in the record with the stylus or needle of a tone arm. The needle was thus placed in the record groove and the arm having substantial weight caused the stylus to remain in the spiral groove. Slight jarring or even tilting of the early phonographs to a slight degree did not impair operation of the device. However, the seeking of high fidelity has uncovered the principle that the lighter the engagement of the stylus with the record groove the greater the chance that the sound will be reproduced without distortion and simultaneously there is less wear and tear on the record grooves. Thus the record players have gone through an evolution and presently the tone arms of record players are vertically balanced to cause some predetermined light pressure of the stylus on the record groove. However the weights used to vertically balance the tone arms have created the added problem of requiring that the record player be accurately leveled in a horizontal plane and requiring also that the record player be free of external jarring or shocking. If these requirements are not fulfilled the stylus tends to jump out of the record groove and the weight used as a vertical counterbalance tends to unbalance the suspension of the tone arm assembly and the weight acts as a flywheel causing undesirable rotation of the tone arm in a lateral plane across the record to scratch the surface of the record and impair the reproduction of the sound on the record.

Figures 3, 4, 5:
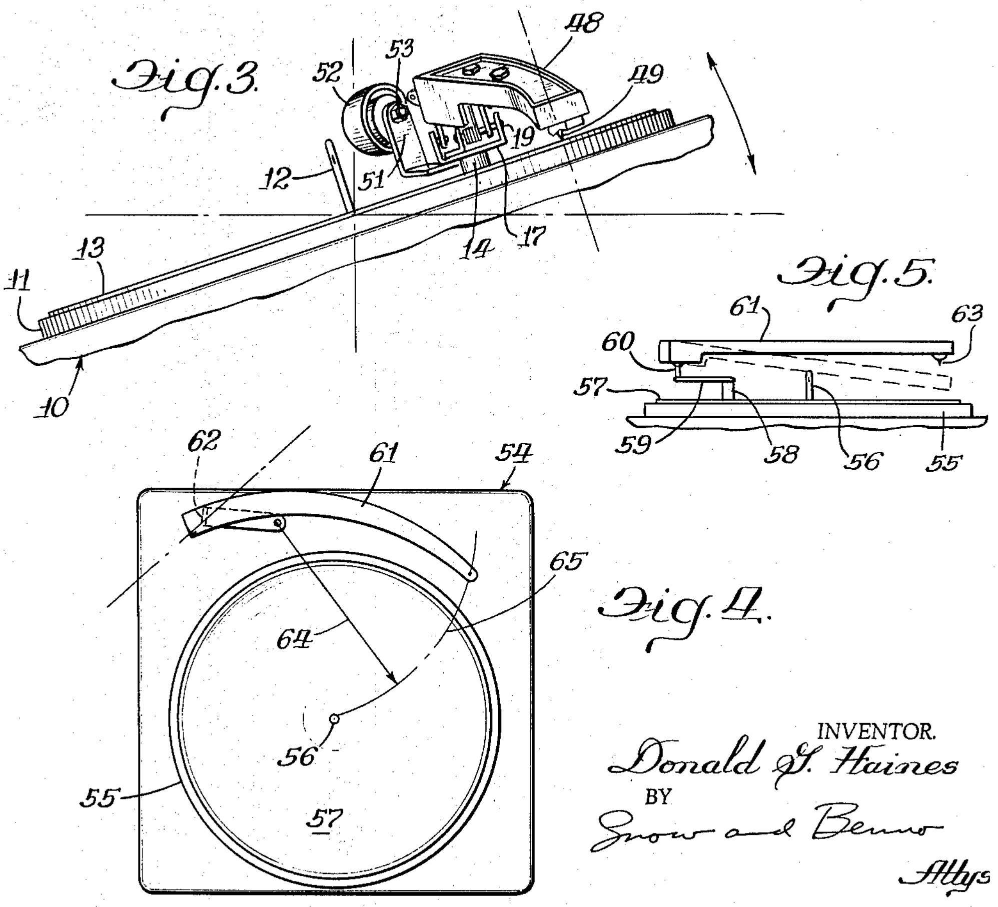
FIGURE 3 is a side elevational view of the device of FIGURE 1 with the supporting table inclined to show an adverse operating condition.
FIGURE 4 is a top plan view of a modified form of tone arm mount of this invention.
FIGURE 5 is a side elevational view of the record player of FIGURE 4.

It is applicant's intention to minimize this undesirable inertial or flywheel effect by reducing the mass in the tone arm while simultaneously obtaining neutral equilibrium of the entire tone arm assembly about its vertically disposed mounting post 14 as shown in FIGURES 1, 2 and 3. FIGURE 3 depicts the table support 10 and including the turntable 11 and the tone arm assembly in an inclined position which is operable with applicant's neutral equilibrium assembly, but certainly would not operate to reproduce the sound of a disc record with a tone arm balanced only to accomplish a desired vertical pressure of the stylus on the record groove. However, in the present device the neutral equilibrium balancing of the entire tone arm assembly about the vertical shaft or post 14 permits unhampered playing of the record even in this undesirable inclined position of the record 13. There is no tendency of the tone arm 48 to swing in an arcuate path about the vertical post 14 despite the use of a counterbalancing weight 52. The disposition of the weight 52 on the stationary portion of the hinge acts to balance the entire tone arm assembly without having any effect whatsoever on the vertical pressure of the tone arm 48 at its stylus end. Rather the minute pressure desired at the stylus end of the tone arm is accomplished by a lightweight tone arm which in effect matches the desired engagement pressure of the stylus on the record. The various hinges in the tone arm assembly permit the necessary movement of the tone arm across the record to be played and its raising as may be required. Applicant's device is distinguished by its ability to resist arcuate swinging movement of the tone arm about the pivot post 14 regardless of the disposition of the table support or the position of the tone arm on the record.

The present application is concerned with obtaining a neutral equilibrium of a tone arm assembly about its pivot of swinging movement. FIGURES 1, 2 and 3 have shown one form of this device. The remaining figures of the drawings show modified devices which obtain the same end result of neutral equilibrium of a tone arm.

FIGURES 4 and 5 show a modified construction in which there is included a table or support 54 having a turntable 55 mounted therewithin. The turntable 55 is provided with a spindle 56 to receive a record 57. A post 58 is mounted on the table support 54 and acts as the means about which a tone arm, to be subsequently described, may pivot. The post 58 is provided with a short arm or plate 59 which projects generally away from the center spindle 56 of the turntable 55. The outer end of the arm 59 is equipped with an upwardly extending post 60 which in turn carries a curved tone arm 61. A generally transversely disposed hinge 62 is disposed intermediate the tone arm 61 and the post 60 to permit vertical swinging movements of the tone arm 61 so that it may move downwardly to engage the record and also be swung upwardly to effect removal of the tone arm from a record. The post 60 in effect constitutes a hinge part. A stylus 63 is provided at the outer end of the tone arm 61 and acts to engage a spiral groove in the record 57 in the same manner as the stylus 49 in FIGURES 1 to 3 inclusive.

In the playing of the record 57 as shown in FIGURES 4 and 5 the post 58 acts as the effective center of rotation of the tone arm 61. A radius 64 is depicted as defining the arc of movement 65 about the post 58 as its center. The offsetting of the arm 59 rearwardly of the hinge or post 58 causes a counterbalancing for neutral equilibrium of the entire tone arm assembly about the effective center post 58. The mass of material of the tone arm disposed toward the end away from the stylus 63 does not act to vertically counterbalance the tone arm, but rather acts to balance the entire assembly about the post 58. The tone arm 61 rests on the record 57 with its full weight about the transverse hinge 62. Thus the tone arm 61 is preferably made of an extremely lightweight material to minimize the degree of force by which the stylus engages the record. The rearward extension of the tone arm 61 beyond the post 58 and including the hinge 62 and the offset arm 59 together constitute a counterbalancing device similar to the weight 52 arranged on the stationary first hinge part 15 of the device in FIGURES 1, 2 and 3. Here again as in the operation of the device of FIGURES 1, 2 and 3 the modified device of FIGURES 4 and 5 eliminates the undesirable characteristic tendency of present-day tone arms to swing across a record if there is any jarring, shocking or inclination of the record player.

Figure 6:
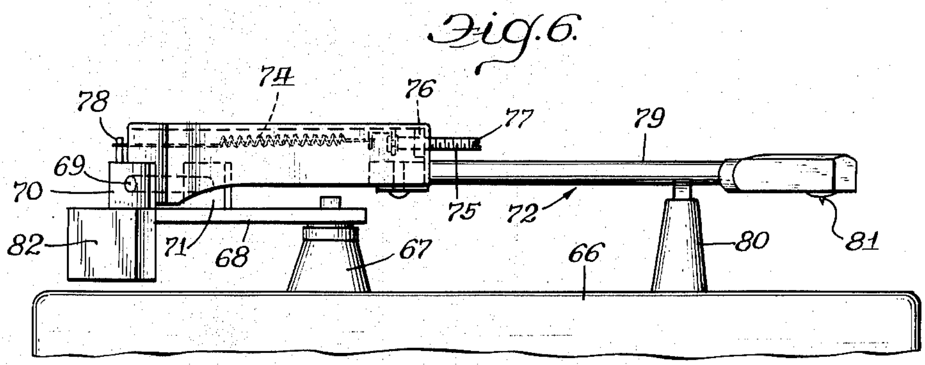
FIGURE 6 is a side elevational view of a still further modified form of tone arm mount for record players.
Figure 7:
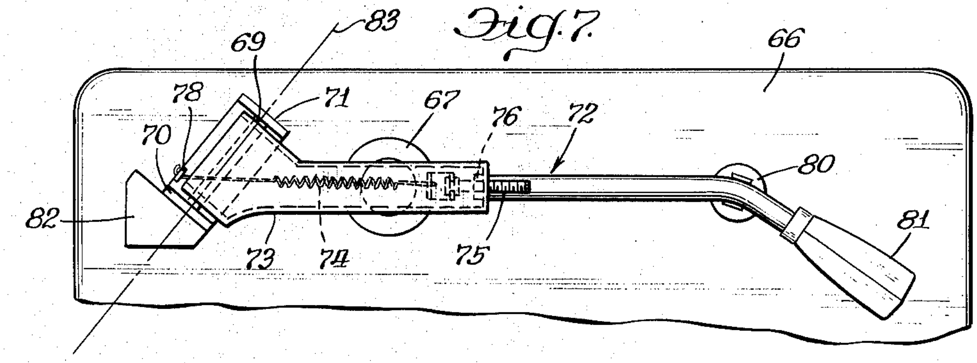
FIGURE 7 is a top plan view of the device as shown in FIGURE 6.

A further modified tone arm mounting is shown in FIGURES 6 and 7. This construction is somewhat similar to the tone arm mounting of FIGURES 4 and 5. The device of FIGURES 6 and 7 includes a tablelike support 66 which has a turntable, not shown, for carrying a record in the playing or reproducing of the recorded sound on that record. A post 67 carries one end of an arm 68 in much the same manner as the offset arm 59 in FIGURES 4 and 5. A diagonally disposed hinge shaft 69 is carried in spaced apart upwardly extending plates 70 and 71 on opposite sides of the outer end of the offset arm 68. A tone arm 72 has its inner end 73 hinged on the diagonally disposed shaft 69. The inner end 73 of the tone arm 72 comprises an inverted U-shaped member to house an adjustable counterbalancing spring 74. A screw 75 threadedly engages a fixed nut 76 on the outer end wall of the inner member 73 of the tone arm. The inner end of the screw is fastened to the spring 74. A screw slot 77 permits turning of the screw to adjust the extension of the long coiled counterbalancing spring 74. A post 78 is mounted on the arm 68 and extends upwardly therefrom to receive the other end of the spring 74. The degree of extension of the spring determines the downward pressure of the tone arm on the record to be played.

The tone arm 72 includes an outer end portion 79 which is curved to provide for proper engagement with a record to be played. The outer end 79 is fastened to the inner end 73 and together they constitute a complete tone arm for reproducing the sound on a record. A resting post 80 is mounted on the table support 66 and provides for holding the outer end of the tone arm. A stylus 81 on the end of the tone arm is employed to engage a spiral groove on a disc record to cause reproduction of the record sound. In this modified form of the invention a counterbalancing weight 82 is mounted on the stationary hinge part of the arm 68. A diagonal axis 83 is coincident with the diagonal hinge pin 69 and constitutes the hinge line about which the tone arm may be raised and lowered. The counterbalancing weight 82 is positioned to a neutral balancing of the entire tone arm assembly about the post 67. Thus again as with the devices of FIGURES 1 through 5 the tone arm 72 does not have its vertical pressure effected by the counterbalancing means, but rather depends for its record engaging pressure on the weight of the arm and the adjustable spring 74. However, the counterbalancing weight 82 affects only arcuate movements of the tone arm assembly about the post 67 and does not affect vertical movement of the tone arm. In the device of FIGURES 6 and 7 the additional feature of having the spring 74 permits adjustment of the degree of pressure which the tone arm stylus 81 will engage the spiral groove of the record.

A still further modified form of the invention is shown in FIGURE 8 in which there is depicted a table support 84. In the same manner as shown in FIGURES 1 and 4 the table 84 is provided with a turntable for rotating a record to be played. In FIGURE 8 the turntable portion has not been shown. A curved tone arm 85 with a mounting such as the tone arm of FIGURE 1 is adapted to engage and play a disc type record. A housing 86 is fixedly mounted on a post 87 which in turn is carried in the table support 84 similar to the mounting of the posts 14, 58 and 67 of the previous devices shown in this application. The housing includes a hinging mechanism to permit up and down movement of the tone arm 85 through the elongated open bottom slot 88 in the forward end of the enclosure 86. The axis of the hinge is shown at 89. In such movements of the tone arm 85 about the hinge axis 89 there is no movement whatsoever of the U-shaped enclosure 86. However when the tone arm rides inwardly on the spiral groove of a record the entire assembly moves about a hinge axis 90 of the post 87. In such movement about the axis 90 the unitary housing or enclosure 86 moves with the tone arm 85. The enclosure 86 houses the rear portion of the tone arm to enclose the hinge on the axis 89 and is employed also to carry suitable weights disposed therewithin to establish a balance or neutral equilibrium about the post 87 as a center. There is thus provided a neutrally balanced tone arm which has its operating mechanism substantially concealed and yet performs the desired function of avoiding a flywheel effect when the record player is tilted or jarred. It should also be understood this modified device may include an adjustable counterbalancing spring such as shown at 74 in FIGURES 6 and 7 which could be used to adjust the vertical balance of the tone arm 85.

Several modified forms of tone arm mountings have been shown in the various figures of the drawings. All of the modified forms of the invention overcome the undesirable inertial effect of present-day tone arms which tend to scratch records and cause arcuate swinging of the tone arm across a record in the event the record player is tilted or jarred in any manner. The construction of the tone arm mountings of FIGURES 1 through 8 inclusive all avoid this characteristic by obtaining a neutral balancing of the tone arm assembly about a supporting post which in turn is carried on a supporting table.

I am aware that numerous details of construction may be varied throughout a wide range without departing from the principles disclosed herein and I, therefore, do not propose limiting the patent granted hereon otherwise than as necessitated by the appended claims.

What is claimed is:

1. A tone arm mount comprising a generally vertically disposed shaft, a first hinge part, a second hinge part cooperating with said first hinge part, a generally horizontally disposed hinge pin carried by and joining said first and second hinge parts for pivotal movement of the second hinge part about the first hinge part, a lightweight tone arm, a record-engaging stylus carried at one end of said tone arm, means mounting the other end of said tone arm on said second hinge part for up and down movement of said tone arm with said second hinge part, means mounting said first hinge part for arcuate movement about said vertically disposed shaft, and an inverted U-shaped housing member fastened to said first hinge part and shielding the second hinge part and the end of said tone arm mounted on said second hinge part, and said housing member including counterweight means placing the center of gravity of all parts on the axis of said shaft, whereby said tone arm is of minimum mass and said stylus is laterally stable.

2. A tone arm mount comprising a generally vertically disposed shaft, an arm member mounted on said shaft, a post member mounted on the outer end of said arm member and said arm member and said post constituting a first hinge part, a second hinge part cooperating with said first hinge part, a generally horizontally disposed hinge pin carried by and joining said first and second hinge parts for pivotal movement of the second hinge part away from the first hinge part, a tone arm, a record-engaging stylus carried at one end of said tone arm, means mounting the other end of said tone arm on said second hinge part for joint up-and-down movement, said first hinge part including a mass spaced from said vertically disposed shaft in a manner and a position to create a rotational equilibrium of all hinge parts and tone arm about the vertically disposed shaft, whereby said tone arm has minimum mass and said stylus is laterally stable.

3. A tone arm mount for record players comprising a generally vertically disposed shaft, a first hinge part constituting an offset arm member having one end carried on said shaft and cooperative hinge elements at the other end thereof and aligned with the axis thereof disposed diagonally of the longitudinal axis of said arm member, a second hinge part for cooperation with the cooperative hinge elements of said first hinge part, a hinge pin carried by and joining said first and second hinge parts for pivotal movement of the second hinge part about the first hinge part, a tone arm, a record-engaging stylus carried at one end of said tone arm, means fixedly mounting the other end of said tone arm on said second hinge part with the axis of said second hinge part disposed diagonally of the longitudinal axis of said tone arm for joint up-and-down movement about the first hinge part, means mounting said offset arm member for rotational movement about said vertically disposed shaft, weight means mounted on said first hinge part and arranged and constructed to create an equilibrium of all hinge parts and tone arm about the vertically disposed shaft, whereby said stylus is laterally stable.

4. A tone arm mount comprising a generally vertically disposed shaft, a first hinge part constituting an offset arm member having one end carried on said shaft and cooperative hinge elements at the other end thereof with the axis of said cooperative hinge elements disposed diagonally of the longitudinal axis of said arm member, a second hinge part cooperating with the cooperative hinge elements of said first hinge part, a hinge pin carried by and joining said first and second hinge parts in a manner to permit pivotal movement of the second hinge part about the first hinge part, a lightweight tone arm, a record-engaging stylus carried at one end of said tone arm, means fastening the other end of said tone arm on said second hinge part with the axis of said second hinge part disposed diagonally to the longitudinal axis of said tone arm for up and down movement with said second hinge part, means mounting said one end of the offset arm member for arcuate movement about said vertically disposed shaft, the weight of said hinge parts being such as to place the center of gravity of all parts including said tone arm on the axis of said shaft so that the mass of said tone arm is a minimum and said stylus is laterally stable under conditions where the axis of said shaft is tilted from the vertical.

5. A device as set forth in claim 4 in which there is further included an adjustable spring interposed between said first hinge part and said tone arm to vary the effective vertical pressure of the tone arm stylus on a record to be played.

6. A tone arm mount comprising a generally vertically disposed shaft, a first hinge part mounted for generally horizontal rotational movement on said shaft, a second hinge part cooperating with said first hinge part, a generally horizontally disposed hinge pin carried by and joining said first and second hinge parts for pivotal movement of the second hinge part about the first hinge part, a lightweight tone arm, a record-engaging stylus carried at one end of said tone arm, means mounting the other end of said tone arm on said second hinge part up and down movement with said second hinge part, counterbalancing means mounted on said first hinge part and arranged and constructed to create an arcuate equilibrium of the first and second hinge parts and the tone arm about the vertically disposed shaft, an inverted U-shaped housing fastened to said generally vertically disposed shaft and acting to shield said counterbalancing means, the second hinge part and the end of said tone arm mounted on said second hinge part, and said inverted U-shaped housing having an open elongated slot in one end thereof for passage of said tone arm, whereby said tone arm is of minimum mass and said stylus is laterally stable.

References Cited by the Examiner

UNITED STATES PATENTS

| | | | |
|---|---|---|---|
| 2,357,034 | 8/1944 | Thompson | 274—23 |
| 2,619,352 | 11/1952 | Martin et al. | 274—23 |
| 2,983,516 | 5/1961 | Bauer et al. | 274—23 |

FOREIGN PATENTS

| | | |
|---|---|---|
| 808,993 | 2/1959 | Great Britain. |

NORTON ANSHER, *Primary Examiner.*